May 19, 1970     ISAMU KUBOTA     3,512,881

RELEASE DEVICE OF MOVIE CAMERA FOR SINGLE FRAME SHOOTING

Filed Nov. 2, 1967     4 Sheets-Sheet 1

May 19, 1970  ISAMU KUBOTA  3,512,881
RELEASE DEVICE OF MOVIE CAMERA FOR SINGLE FRAME SHOOTING
Filed Nov. 2, 1967
4 Sheets-Sheet 4

United States Patent Office 3,512,881
Patented May 19, 1970

3,512,881
RELEASE DEVICE OF MOVIE CAMERA
FOR SINGLE FRAME SHOOTING
Isamu Kubota, Sakai, Japan, assignor to Minolta Camera Kabushiki Kaisha, Osaka, Japan, a corporation of Japan
Filed Nov. 2, 1967, Ser. No. 680,195
Claims priority, application Japan, Nov. 2, 1966, 41/72,484
Int. Cl. G03b 17/46
U.S. Cl. 352—169
2 Claims

ABSTRACT OF THE DISCLOSURE

A release device of a movie camera for single frame shooting, in which an actuating circuit is adapted to be opened when or just before the main shaft of shutter blades completes a full rotation for the single frame shooting, so that electric energy will not be wasted. By the interruption of the actuating circuit upon full rotation of the main shaft during the single frame shooting, no torque is applied to the shaft after the full rotation, and hence, the magnitude of force for releasing the engagement between a stopper and a release lever is reduced.

---

This invention relates to a release device of a movie camera for single frame shooting, and more particularly to a release device of a movie camera for single frame shooting of very efficient type, which can be actuated with a small releasing force.

In a known release device of an electrically operated movie camera for single frame shooting, an actuating circuit of the camera is kept closed even after a full rotation of the main shaft of a shutter system for single frame shooting. Accordingly, electric energy is wasted in the actuating circuit during the mode of operation for single frame shooting after the actual exposure period for the single frame. At the same time, unnecessary torque is produced on the main shaft of the shutter by a sustained current after the shooting for a single frame, and hence, a large force is required to remove a release lever from a stopper holding the lever against such unnecesary torque. Such unnecessary torque also causes harmful stress on various parts of the shutter operating mechanism, which can lead to various mechanical troubles on the camera.

Therefore, an object of the present invention is to obviate the aforesaid difficulties by providing a release device of simple construction for a movie camera for the single frame shooting, in which shutter blades can be stopped at a certain position after each single frame shooting to interrupt the actuating circuit of the camera, and the selection between the continuous shooting and the single frame shooting can be made with ease.

Other objects and a fuller understanding of the present invention may be had by referring to the following description, taken in conjunction with the accompanying drawings, in which.

Like parts are designated by like symbols and numerals throughout the drawings.

Figure 1:
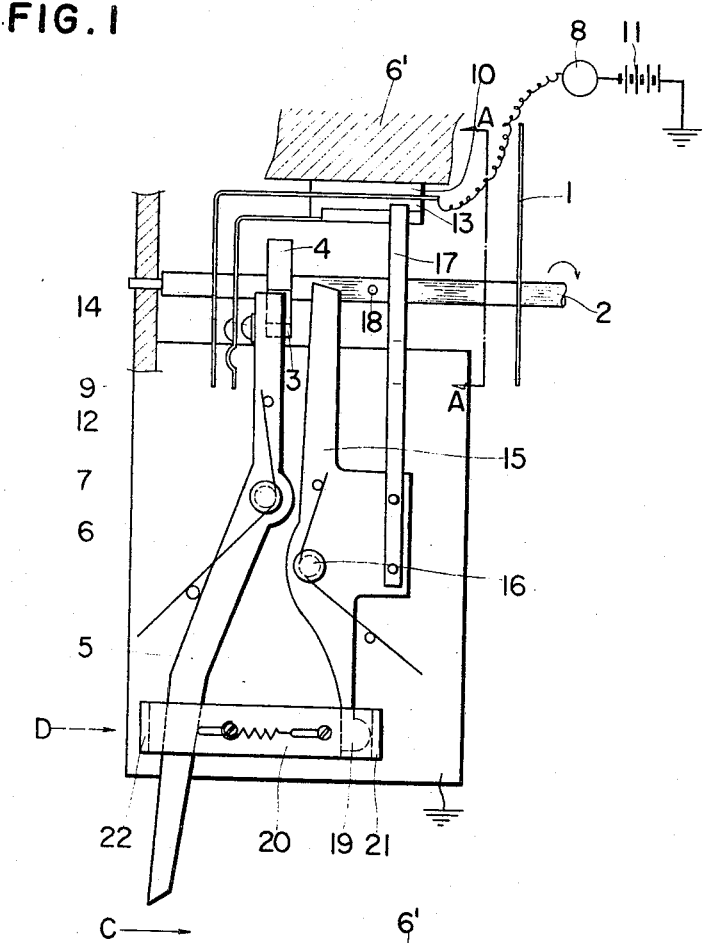
FIG. 1 is a schematic front view of a release device according to the present invention, shown in the unactuated state.
Figure 2:
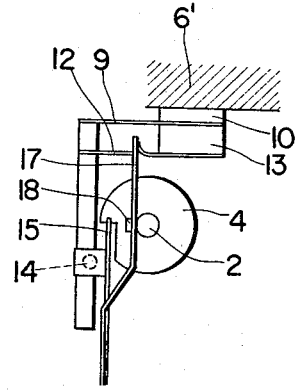
FIG. 2 is a partial schematic side view of the device as shown in FIG. 1, as viewed along the line A—A thereof.

Referring to FIGS. 1 and 2, shutter blades 1 and a main stopper 4 are secured to a main shaft 2, with a suitable spacing between each other. The stopper 4 is disk shaped and has a notch 3 cut parallel with the axial center line of the main shaft 2, as best shown in FIG. 2. The main shaft is driven counterclockwise, as seen in FIG. 2, by a motor 8. A first stop lever 5 is rotatably supported by a shaft 7 extending from portion 6 of the movie camera body. The upper end of the lever 5 is adapted to engage with the notch 3 when the movie camera is not actuated, as shown in FIG. 1. The first stop lever 5 is biased clockwise by a suitable biasing means, such as a spring. When the lever 5 is rotated counterclockwise, the upper end of the lever is removed from the main stopper notch 3 to allow the rotation of the main shaft 2. An insulated pin 14 is formed at the upper end of the first stop lever 5, which is adapted to urge an electric contact blade 12 toward a cooperating electric contact blade 9 to make a circuit there between when the lever 5 is removed from the notch 3 of the stopper 4. The contact blade 9 is supported by an insulated base 10 secured to another portion 6' of the camera body and electrically connected to the motor 8 through a lead wire. Another terminal of the motor 8 is connected to a power source, e.g. a battery 11. The other electric contact blade 12 is supported by another insulated base 13 laminated on said contact blade 9 in such a manner that, the upper end of the contact blade 12 cooperates with a third contact blade 17 to be described hereinafter to form a switching contact between them.

A second stop lever 15 is rotatably supported by another shaft 16 extending from portion 6 of the movie camera body, and the upper end of this second stop lever 15 is also engageable with the notch 3 of the main stopper 4 when it is turned counter-clockwise. By a suitable biasing means, e.g. a spring, a counter-clockwise bias force is applied to the second stop lever 15. The lower end 19 of the lever 15 is engaged with the bent portion 21 of an actuating lever 20 for the single frame shooting to hold the lever 15 against such counter-clockwise bias force. The contact blade 17 mounted on the second stop lever 15 is normally kept in contact with the aforesaid contact blade 12 at the upper end thereof, and the lower end of the blade 17 is grounded or connected to the movie camera body. Thus, an actuating circuit for the motor 8 to drive the main shaft 2 of the shutter blades 1 is formed, which traces from the movie camera body through the battery 11, the motor 8, the contact blade 9, the cooperating contact blade 12, and the third contact blade 17 normally engaged with the cooperating contact blade 12, back to the movie camera body. An insulated switching pin 18 is secured to the main shaft 2 in such a manner that when the second stop lever 15 engages the notch 3 of the main stopper 4 by counter-clockwise rotation thereof, the switching pin 18 comes into contact with the third lever 17 to move the latter away from the cooperating contact blade 12, thereby, the aforesaid actuating circuit of the motor 8 is switched off at the end of each full rotation of the main shaft for the single frame shooting.

The actuating lever 20 for the single frame shooting is so biased as to hold the second stop lever 15 at the position as shown in FIG. 1 against the counter-clockwise bias by the mechanical engagement between the lower end 19 of the second stop lever 15 and the bent portion 21 of the actuating lever 20. The opposite end 22 of the actuating lever 20 is also bent so as to engage with the lower portion of the first stop lever 5, when the actuating lever 20 is operated by pushing it to the right, as seen in FIG. 1.

In operation, for continuous shooting, the lower end of the first stop lever 5 is pushed rightwards, as shown by an arrow "C" in FIG. 1 to turn the lever 5 counter-clockwise around the shaft 7. Then, the upper end of the stop lever 5 is removed from the notch 3 of the main stopper 4, and upon or just prior to the removal of the upper end, the contact blades 9 and 12 are engaged with each other by the insulated pin 14 to close the actuating circuit of the motor 8 to drive the main shaft 2 of the shutter. The manner in which the first stop lever 5 is actuated is not limited to the aforesaid pushing of the lower end thereof, but it can be actuated by a push-button, a wire-release, or any other suitable means. If the camera mechanism does not allow direct manual actuation thereof, the lever 5 can be actuated from any direction through a direction-converting means.

Figure 3:
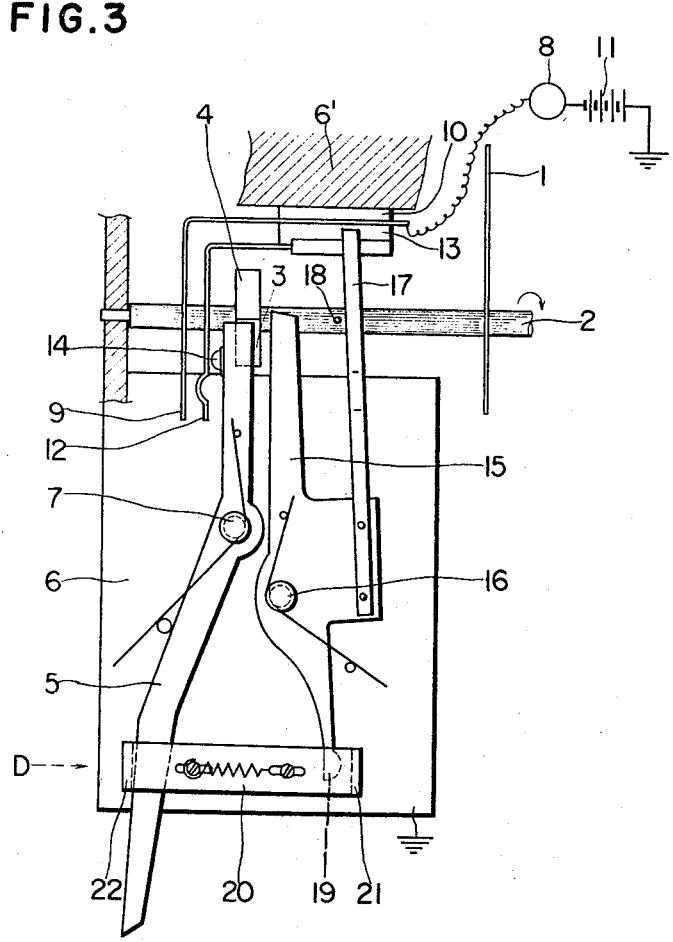
FIG. 3 is a schematic front view of the release device for single frame shooting according to the present invention, shown at a position during operation thereof.
Figure 4:
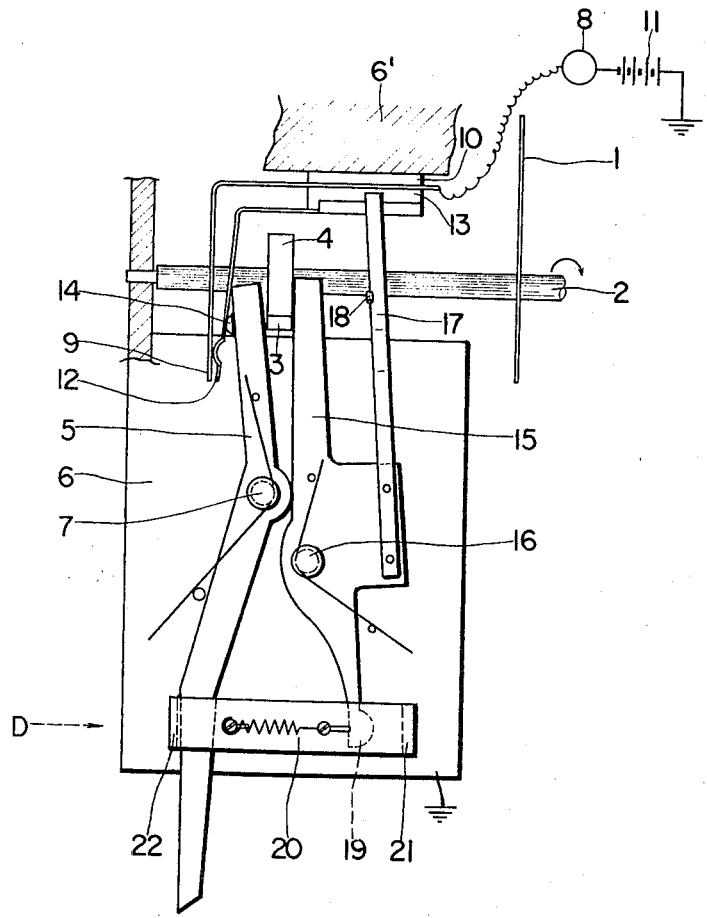
FIG. 4 is a view similar to FIG. 3, shown at another position during the operation thereof.
Figure 5:
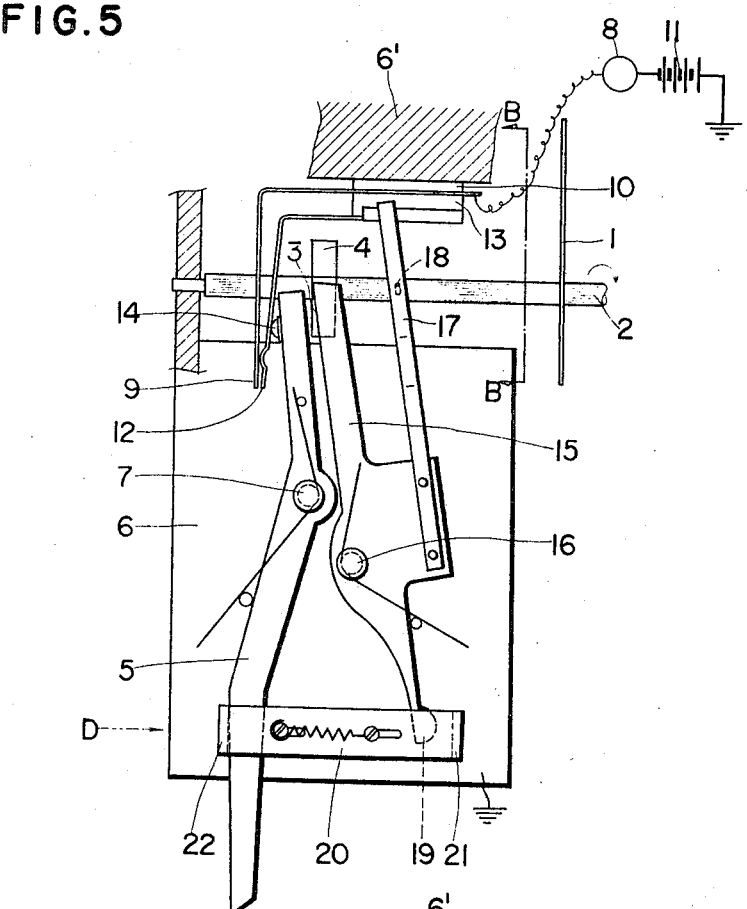
FIG. 5 is a schematic front view of the release device as shown in FIG. 3, shown in the state upon completion of the single frame shooting.
Figure 6:
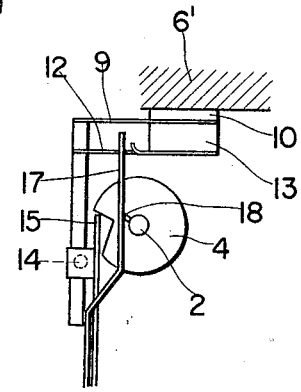
FIG. 6 is a partial schematic side view, as viewed along the line B—B in FIG. 5.

For a single frame shooting, the actuating lever 20 is pushed rightwards, as shown by a dotted arrow D. Then, as a first step of the single frame shooting operation, the second stop lever 15 rotates counter-clockwise until the left hand edge of the third contact blade 17 engages with the switching pin 18, as shown in FIG. 3. Due to such engagement between the left hand edge of the contact blade 17 and the pin 18, further rotation of the lever 15 is prevented to keep the upper end of the lever 15 away from the notch 3 of the main stopper 4. As the actuating lever 20 is pushed further rightwards, the bent portion 22 engages with the lower portion of the first stop lever 5 to rotate the lever 5 counter-clockwise in the same manner as the continuous shooting described hereinbefore. Thus, the main shaft 2 of the shutter system starts rotating, as shown in FIG. 4. When the switching pin 18 secured to the shaft 2 comes to the downward position, the engagement between the pin 18 and the left hand edge of the third contact blade 17 is released to bring the upper end of the second stop lever 15 in contact with the right hand surface of the main stopper 4. Upon or just prior to full rotation of the main shaft 2, the upper end of the second stop lever 15 fits in the notch 3 of the main stopper 4 to stop the rotation of the main shaft, and at the same time, the back side of the third contact blade 17, as seen in FIG. 4, is shifted away from the main shaft 2 by the engagement between the rear side of the blade 17 and the switching pin 18, as best shown in FIG. 6. Such shift of the contact blade 17 results in the disengagement of the third blade 17 from the blade 12 to interrupt the actuating circuit of the motor 8. Accordingly, the motor is de-energized and the battery 11 is freed from feeding useless current to the actuating circuit.

It is apparent that such freeing of the battery 11 eliminates waste of electric energy during the period of time following the completion of the single frame shooting, and also removes the unnecessary torque applied to the motor 8 and the main shaft 2, which could have been generated if the actuating circuit were not interrupted. Thereby, the release device is made efficient, and the magnitude of force necessary for removing the upper end of the second stop lever 15 from the notch is reduced.

To return the mode of operation from the single frame shooting to the normal operation, the actuating lever 20 is pulled back to the left. Then, the second stop lever 15 is removed from the notch 3 by the engagement between the lower end 19 of the lever 15 and the bent portion 21 of the actuating lever 20. At about the same time, the upper end of the first stop lever 5 engages with the notch 3, and the third contact blade 17 disengages from the switching pin 18 to come into operative engagement with the other contact blade 12. Thus, the entire release device is made ready for the succeeding shooting operation.

In the return mode of operation, if the upper end of the second stop lever 15 should be removed from the notch 3 too fast and the upper end of the first stop lever 5 should fail to engage with the notch 3 immediately after the disengagement of the second stop lever 17 therefrom, the actuating circuit of the motor 8 is completed, because the first stop lever 5 is positioned away from the stopper 4 to cause engagement between the contact blades 9 and 12. Accordingly, the main shaft 2 and the stopper 4 rotate by one revolution to insure the correct engagement of the upper end of the first stop lever 5 in the notch 3.

The single frame shooting is usually performed by mounting the movie camera on a tripod, and hence, the actuating lever 20 can be operated by a suitable wire-release means (not shown) mounted on the movie camera.

Although the present invention has been described with a certain degree of particularity, it is understood that the present disclosure has been made only by way of example and that numerous changes and modifications in the details of construction and the combination and arrangement of parts may be resorted to without departing from the scope and the spirit of the invention.

What is claimed is:

1. A release device for single frame shooting in a movie camera comprising a power source, a motor connected in circuit with said power source, switching means in said circuit, a main shaft driven in rotation by said motor and supporting shutter blades, said release device including a main stopper with a notch mounted on said shaft, a first insulated switching pin secured on said shaft, a first pivotal stop lever, a second insulated switching pin secured on said first stop lever, a second pivotal stop lever, a contact blade mounted on said second lever and engageable with said first insulated switching pin, biasing means acting on both said first and second stop levers to urge the same to respective positions in which the upper ends thereof engage with said notch of said main stopper to prevent said main shaft from rotating, said switching means including a first switch to be closed by said second insulated switching pin when said first stop lever is disengaged from said main stopper and a second switch connected in series with said first switch, said second switch being constituted by a fixed contact blade and said contact blade on said second lever to be opened at the end of each full rotation of said main shaft for the single frame shooting, and an actuating lever for selecting the single frame shooting operation, said actuating lever being coupled to said stop levers to initiate rotation of the main shaft by disengaging said first stop lever from the main stopper notch and terminating each full rotation of said main shaft by engaging said second stop lever in said notch at the end of each full rotation, said contact blade on said second lever being positioned thereon to contact said shaft when the second stop lever is engaged in said notch so as to be displaced by said first pin away from said fixed contact blade as the shaft completes one full rotation thereof, thereby opening said circuit by opening said second switch.

2. A device as claimed in claim 1, wherein said contact blade on said second lever is positioned in lateral contact with said shaft and in abutment contact with said first pin when the actuator is displaced to the position for selecting single frame shooting, said switches then being closed and said motor energized to commence rotation of said shaft, said first pin and motor being relatively oriented on said shaft so that said first pin prevents said second lever from entering said notch until the shaft has rotated through a given angle in which the first pin is out of contact with said contact blade on said second lever, the latter said contact blade being laterally displaced by said pin to open the second switch as the shaft completes a full rotation.

References Cited

UNITED STATES PATENTS 3,094,033  6/1963  Thiele _____ 352—169

NORTON ANSHER, Primary Examiner

M. H. HAYES, Assistant Examiner

U.S. Cl. X.R.

352—137, 176, 178